(12) United States Patent
Scaini et al.

(10) Patent No.: US 8,998,533 B2
(45) Date of Patent: Apr. 7, 2015

(54) PREFABRICATION OF PIPE STRINGS ON BOARD OF PIPE-LAYING VESSELS

(75) Inventors: Cristian Scaini, Azzano San Paolo (IT); Davide Rossin, Bregnano (IT)

(73) Assignee: Saipem S.p.A., San Donato, Milanese (IT)

( * ) Notice: Subject to any disclaimer, the term of this patent is extended or adjusted under 35 U.S.C. 154(b) by 974 days.

(21) Appl. No.: 12/530,083

(22) PCT Filed: Mar. 6, 2008

(86) PCT No.: PCT/EP2008/001788
§ 371 (c)(1),
(2), (4) Date: Sep. 23, 2009

(87) PCT Pub. No.: WO2008/107185
PCT Pub. Date: Sep. 12, 2008

(65) Prior Publication Data
US 2010/0104371 A1    Apr. 29, 2010

(30) Foreign Application Priority Data
Mar. 7, 2007 (GB) .................................. 0704410.0

(51) Int. Cl.
*F16L 1/12* (2006.01)
*F16L 1/20* (2006.01)

(52) U.S. Cl.
CPC ...................................... *F16L 1/207* (2013.01)

(58) Field of Classification Search
CPC ............... F16L 1/12; F16L 1/16; F16L 1/161; F16L 1/207
USPC .................................. 405/158, 166, 169, 170
See application file for complete search history.

(56) References Cited

U.S. PATENT DOCUMENTS 3,822,558 A    7/1974 Blankenship
3,967,461 A    7/1976 Rosa et al.

(Continued)

FOREIGN PATENT DOCUMENTS

EP    0 302 038       2/1989
GB    2 095 787 A    10/1982

(Continued)

OTHER PUBLICATIONS

International Search Report and the Written Opinion of the International Searching Authority (Forms PCT/ISA/210 and PCT/ISA/237) issued in corresponding International Application No. PCT/EP2008/001789 dated Jul. 30, 2008.

(Continued)

*Primary Examiner* — Benjamin Fiorello
(74) *Attorney, Agent, or Firm* — Buchanan Ingersoll & Rooney PC

(57) ABSTRACT

A method of laying pipeline from a vessel (10) is disclosed. The vessel (10) includes many pipe processing stations (36, 42), arranged across the width of the vessel. In one embodiment, there are two pipe processing areas (38, 40) separated along the length of the vessel. The pipe processing stations (36, 42) may be operable in two modes of operation, for example, a first mode of operation where the vessel produces triple joint pipe strings (from three lengths of pipe section welded together) and a second mode of operation where double joint pipe strings are produced, for example, from two single length pipe sections having a significantly greater length than the single length pipe sections used in the first mode of operation. In one embodiment, a triple joint pipe section is part welded in one pipe processing area (38), then moved along the length of the vessel (10) to a different pipe processing area, where further welding operations are performed on the triple joint. In order for the vessel to operate in two modes of operation, the storage bin facilities (12) for storing single length pipe sections are configured to be able to accommodate different lengths of single length pipe section arranged end to end in a single bin.

11 Claims, 8 Drawing Sheets

(56) References Cited

U.S. PATENT DOCUMENTS

| | | | |
|---|---|---|---|
| 4,257,718 A | | 3/1981 | Rosa et al. |
| 4,486,123 A | * | 12/1984 | Koch et al. ............. 405/169 |
| 5,011,333 A | | 4/1991 | Lanan |
| 5,044,825 A | | 9/1991 | Kaldenbach |
| 5,823,712 A | | 10/1998 | Kalkman et al. |
| 5,836,719 A | | 11/1998 | Martin et al. |
| 6,004,071 A | * | 12/1999 | Broeder et al. .......... 405/166 |
| 6,352,388 B1 | * | 3/2002 | Seguin ..................... 405/166 |
| 2003/0219313 A1 | | 11/2003 | Giovannini et al. |
| 2006/0188341 A1 | | 8/2006 | Stockstill |

FOREIGN PATENT DOCUMENTS

| | | |
|---|---|---|
| GB | 2 335 722 A | 9/1999 |
| NL | 8 802 725 A | 6/1990 |
| WO | WO 95/25237 A1 | 9/1995 |
| WO | WO 2004/068012 A2 | 8/2004 |
| WO | WO 2007/000609 A2 | 1/2007 |

OTHER PUBLICATIONS

S. Bianchi, U.S. Appl. No. 12/530,091, entitled "Undersea Pipe-Laying" filed Sep. 23, 2009.

GB Search Report in GB0704411.8 dated Jun. 28, 2007.

GB Search Report in GB0704410.0 dated Mar. 12, 2008.

International Search Report (PCT/ISA/210) for PCT/EP2008/001788 mailed Jun. 17, 2009.

Written Opinion (PCT/ISA/237) for PCT/EP2008/001788 mailed Jun. 17, 2009.

* cited by examiner

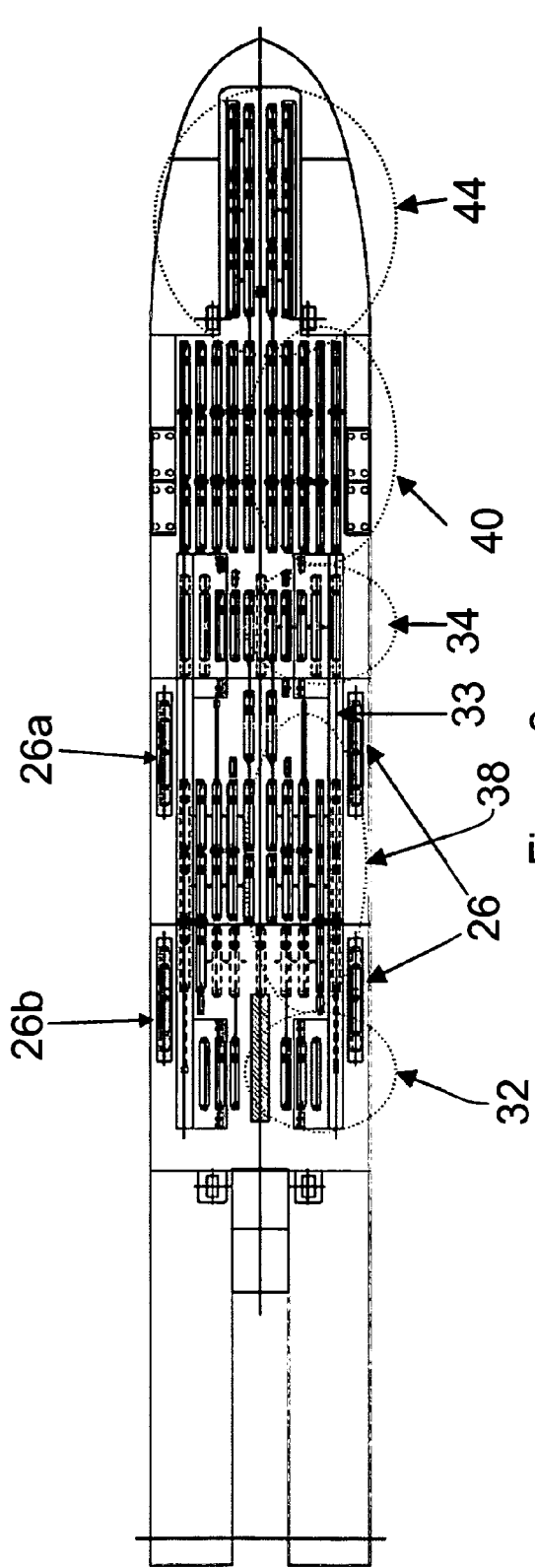
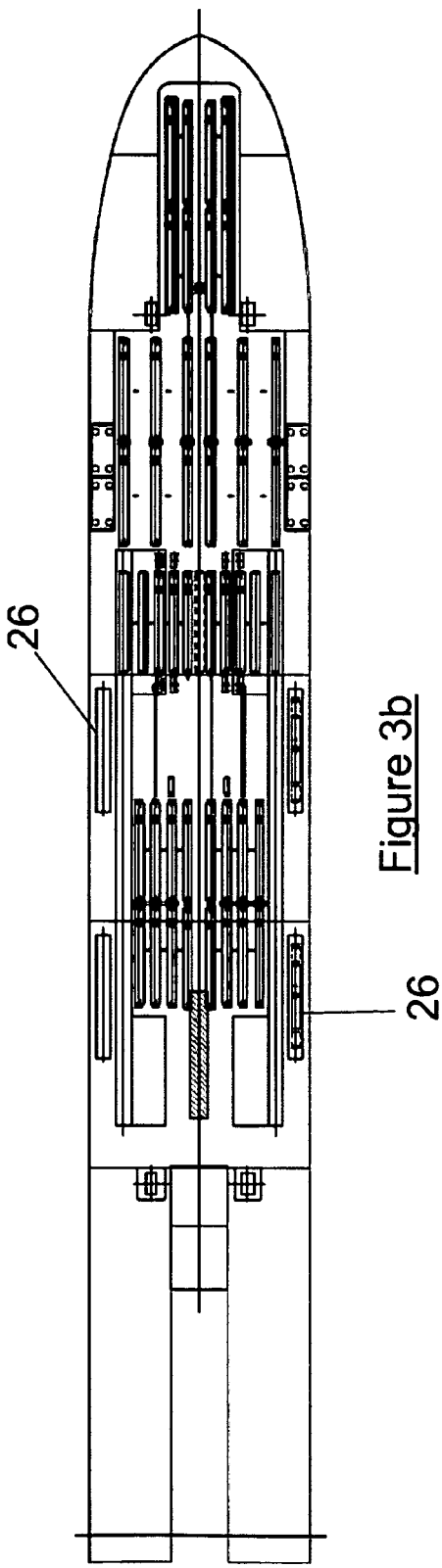

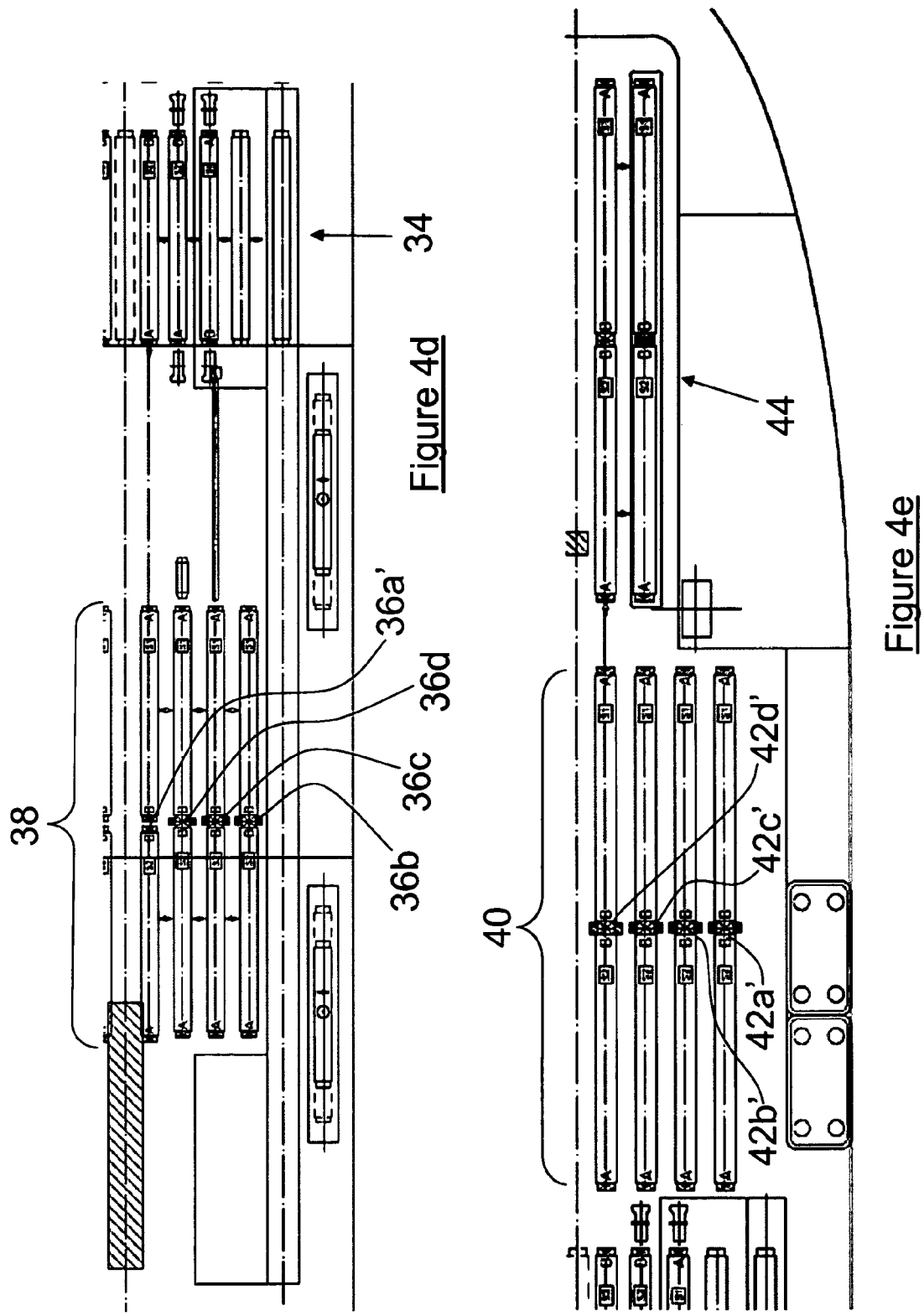

PREFABRICATION OF PIPE STRINGS ON BOARD OF PIPE-LAYING VESSELS

TECHNICAL FIELD

The present invention relates to a method and a vessel for storage and/or prefabrication of pipes for subsequent use by a pipelaying vessel.

BACKGROUND OF THE INVENTION

Offshore pipelines, for example gas and or oil pipelines, are laid by vessels such as water crafts, barges, semi-submersibles or the like. Such pipelaying vessels are well known in the art. Examples in the art of such pipelaying vessels include U.S. Pat. No. 3,967,461, U.S. Pat. No. 4,257,718, U.S. Pat. No. 5,044,825 and U.S. Pat. No. 5,823,712.

Typically, the pipeline is assembled in a firing line (the main production line) composed by a variety of operating stations, such as welding stations and testing stations. The pipeline is extended by joining pipe sections to the end of the pipeline. Such pipe sections (typically called "pipe strings") are formed of a variety of single length pipe sections (typically called "bars"), which are preassembled either in onshore yards or directly on board the laying vessel. Such bars typically have a length of 12 meters long and may be formed into pipe strings of 24 meters (a double joint or 2J), 36 meters (a triple joint or 3J), or 48 meters (quadruple joint or 4J). The present invention concerns the case where such pipe strings are preassembled on board the vessel. Such a process is typically referred to as prefabrication. Prefabrication operations carried out on the vessel may include any or all of the following:

- Beveling of the ends of the single length pipe sections (bars) for subsequent joining;
- Welding between adjacent bars in a pipe string to be prefabricated;
- Performance of non-destructive testing on the intermediate weld so formed;
- Field joint coating of the intermediate welds so formed (i.e. partially or completely restoring the pipe coating that needs to be removed so as to facilitate welding together of the single bars); and
- Beveling of the ends of the single bars, which eventually form the endings of the realised pipe string (joined pipe section).

Pipe strings prepared in this way may be temporarily stored in an area on the vessel which is used to feed the main production line (the "firing line"). In order to avoid unnecessary downtime, such a storage area may be arranged to hold a predetermined minimum number of pipe strings so as to provide a reliable supply of pipe strings for the firing line. The storage may also be fed by more than one prefabrication system. It will be appreciated that the operating stations in the firing line are arranged in series and are typically separated by a distance equal to the length of the pipe string.

The operating stations in the prefabrication system typically work in parallel and are dedicated to different operations, for example welding (first, subsequent and finishing passes), monitoring (NDT) and restoring of the connecting zone (Field Joint Coating including filling). Typically, there are from two to five welding stations, one NDT station and at least one, perhaps more, FJC and filling stations. Every joint is therefore worked sequentially in several stations. At the end of the cycle, the pipeline being laid is extended by a length of one pipe string. The cycle time is dictated by the slowest station (the critical station). The function of each workstation is usually decided by dividing the tasks between the stations in the most efficient way (each station being assigned one or more operations). In some cases (for example in the case of a multiple bar joint, for example the double joint), there are intermediate stations in the firing line which are arranged to perform only FJC or filling operations on the intermediate welding (realized offline in the prefabrication system). Whether during the prefabrication or during the manufacturing in firing line, welding operations are typically the most likely to cause delay in the pipelaying process. For example, certain welds may require repair or complete elimination (cutting) and remaking operations. Said operations can adversely affect the production cycle time.

The present invention seeks to improve prefabrication efficiency. The present invention alternatively, or additionally, seeks to provide a prefabrication method or vessel, for use in the field of narrow mono-hull vessels, which have the advantage of facilitating the laying of pipelines in different conditions with relatively high productivity. Alternatively or additionally, the present arrangement seeks to provide a more flexible means of laying pipeline than previously proposed in the art. The present invention alternatively, or additionally, seeks to provide a method or vessel for laying pipelines with a large diameter, preferably in deep water.

SUMMARY OF THE INVENTION

The present invention provides, according to a first aspect of the present invention, a method of laying pipeline from a vessel, wherein the method comprises the following steps:

providing a vessel having a deck on which there are arranged a multiplicity of pipe processing stations across the width of the vessel, the pipe processing stations defining at least one pipe processing area, simultaneously operating the pipe processing stations in a first mode of operation to form a multiplicity of jointed pipe sections extending longitudinally along the length of the vessel, each jointed pipe section being formed by joining together a number, $X_i$, of single-length pipe sections each having a length $L_i$, and operating the pipe processing stations in a second mode of operation by forming a multiplicity of jointed pipe sections, each jointed pipe section being formed by joining together a number, $X_j$, of single-length pipe sections each having a length $L_j$, wherein $$X_i > X_j > 1,$$

$$L_i < L_j, \text{ and}$$

at least a plurality of the pipe processing stations perform a function in both the first and second modes of operation.

According to this first aspect of the invention there is also provided a pipelaying vessel comprising a deck having at least one pipe processing area comprising a multiplicity of pipe processing stations arranged across the width of the vessel and arranged to process pipe sections in parallel with the pipe sections extending longitudinally along the length of the vessel, wherein said multiplicity of pipe processing stations have at least two modes of operation including a first mode of operation in which at least a plurality of the pipe processing stations are used to form jointed pipe sections, each jointed pipe section being formed from a number, $X_i$, of single-length pipe sections each having a length $L_i$, and a second mode of operation in which the pipe processing stations, including at least a plurality of the pipe processing stations used in the first mode of operation, are used to form jointed pipe sections, each jointed pipe section being formed from a number, $X_j$, of single-length pipe sections each having a length $L_j$, and wherein $X_i > X_j > 1$ and $L_i < L_j$.

Thus, the vessel is operated in two different modes of operation and is able to lay pipe-lines using single length pipe sections of differing lengths. The first and second modes of operation are preferably performed at different times. The method may be performed such that only one pipeline is laid by vessel at a time. The single length pipe sections used to form the pipeline may be substantially entirely formed from pipe sections having the same length (i.e. either $L_i$ or $L_j$).

$X_i$ may be equal to three. $X_j$ may be equal to two. $X_i$ may be equal to four. $X_j$ may be equal to three. In an embodiment of the invention described below, $X_i=3$ and $X_j=2$, so that there is a first mode of operation in which triple-length pipe sections are each formed from three single-length pipe sections, and a second mode of operation in which double-length pipe sections are each formed from two single-length pipe sections.

It is of course within the scope of the present invention for $X_i=4$ and $X_j=2$ (a vessel producing either double length pipe sections or quad-joints, the double length pipe-sections being longer than half the length of the quad-joint pipe-sections) or $X_i=4$ and $X_j=3$ (a vessel producing either triple length pipe sections or quad-joints, the triple length pipe-sections being longer than 3/4 of the length of the quad-joint pipe-sections).

The length $L_i$ of the single-length pipe sections used in the first mode of operation may be greater than 5 m. The length of the single-length pipe sections used in the second mode of operation may be at least 10% longer than the length of the single-length pipe sections used in the first mode of operation, and are preferably at least 20% longer. The length $L_i$ of the single-length pipe sections used in the first mode of operation may be greater than 10 m. For example, $L_i$ may be equal to about 12 m. The length $L_j$ of the single-length pipe sections used in the second mode of operation may be greater than 15 m. For example, $L_j$ may be equal to about 18 m.

The length and number of single-length pipe sections used in the first and second modes of operation may be such that the length of the jointed pipe sections resulting from the first mode of operation is substantially equal to the length of the jointed pipe sections resulting from the second mode of operation. Thus, the product $X_i L_i$ may be substantially equal to the product $X_j L_j$. In this context and allowing for manufacturing tolerances the term "substantially equal to" will encompass within its scope both (a) exactly equal to and (b) equal to each other within a margin of error of ±10%. Such an arrangement may allow the operating stations that act on the joints between respective jointed pipe sections (e.g. respective "pipe strings") when joined to the pipeline in the firing line to be in substantially the same configuration as between the first and second modes of operation.

As mentioned above, at least some of the pipe processing stations used in the first mode of operation perform a function in both the first and second modes of operation. Some of the pipe processing stations may perform the same function in the same location in both the first and second modes of operation. Having more pipe processing stations arranged to perform the same function in the same location in both the first and second modes of operation may reduce the amount of change required in order to allow the vessel to be adapted to switch its mode of operation between the first and second modes. Some of the pipe processing stations may perform the same function, but in a different location in both the first and second modes of operation. Some of the pipe processing stations may perform a different function, but in the same location in both the first and second modes of operation. Some of the pipe processing stations may perform a function in the first mode of operation, but be redundant in the second mode of operation.

In an embodiment of the invention, embodying this first aspect of the present invention, there is provided a pipelaying monohull vessel comprising a deck having at least one pipe processing area comprising a multiplicity of pipe processing stations arranged across the width of the vessel and arranged to process pipe sections in parallel with the pipe sections extending longitudinally along the length of the vessel, wherein said multiplicity of pipe processing stations have at least two modes of operation including a first mode of operation in which triple-length pipe sections are each formed from three single-length pipe sections, and a second mode of operation in which double-length pipe sections are each formed from two single-length pipe sections, and wherein the length of the single-length pipe sections used in the second mode of operation is at least 10% longer than the length of the single-length pipe sections used in the first mode of operation. All of said multiplicity of pipe processing stations may be arranged to perform a function in both the first and second modes of operation. It will of course be appreciated that there may need to be further pipe processing stations in order to produce pipe sections in one or other or both of the first and second modes of operation. Thus, said at least one pipe processing area may comprise at least one further pipe processing station used in one only of the first and second modes of operation.

According to a second aspect of the present invention there is provided a method of laying a pipeline from a vessel, wherein the method comprises the following steps:

a) providing a vessel comprising a deck having a first pipe processing area and a second pipe processing area, the pipe processing areas each comprising a multiplicity of pipe processing stations arranged across the width of the vessel and arranged to process pipe sections in parallel with the pipe sections extending longitudinally along the length of the vessel, the first and second pipe processing areas being separated from each other in a direction along the length of the vessel, b) arranging two single-length pipe sections end-to-end to define a junction therebetween, c) with a first pipe processing station in the first pipe processing area, forming a partial weld at the junction between the two single-length pipe sections, the two single-length pipe sections defining a double-length pipe section, d) passing said double-length pipe section to a second pipe processing station in the first pipe processing area, e) with the second pipe processing station, forming a partial weld at a junction between the double-length pipe section and a further single-length pipe section arranged end-to-end in relation thereto, thereby forming a triple-length pipe-section, f) passing the triple-length pipe section so formed to a third pipe processing station in the second pipe processing area, and g) with the third pipe processing station, adding weld material to the region of the junction between the double-length pipe section and the further single-length pipe section.

There is also provided, according to this second aspect, a pipelaying vessel comprising a deck having a first pipe processing area and a second pipe processing area, wherein a) the pipe processing areas each comprise a multiplicity of pipe processing stations arranged across the width of the vessel, the stations being arranged to parallel process pipe sections, with the pipe sections extending longitudinally along the length of the vessel, b) the first and second pipe processing areas are separated from each other in a direction along the length of the vessel, c) the first pipe processing area includes a first welding station arranged to form a partial weld at a junction between two single-length pipe sections, the two single-length pipe sections defining a double-length pipe section, d) the first pipe processing area includes a second welding station arranged to weld at a junction between a double-length pipe section passed from the first welding station and a further single-length pipe section to form a triple-length pipe-section, and e) the second pipe processing area includes a third welding station arranged to add weld material to the region of the junction between the double-length pipe section and the further single-length pipe section.

Thus in accordance with embodiments of the second aspect of the invention, the welding of at least one of the joints of a triple joint pipe section is conducted in two separate pipe processing areas arranged along the length of the vessel. Conventionally, all welding operations on a single joint are conducted quickly in succession so that the weld material does not cool too much, and therefore, in arrangements of the prior art, the welding operations on a single joint are all conducted in the same pipe processing area on the vessel, the pipe sections not being moved along the length of the vessel between welding operations. Whilst the arrangement proposed by the present invention may deviate from such conventional arrangements, it is considered that splitting the welding process between first and second pipe processing areas may advantageously allow better and more efficient use of the pipe processing stations arranged across the width of the vessel. For example, such an arrangement may facilitate better utilisation of the space available across the width of the vessel, because the present invention allows the positioning of welding stations for a single joint one after the other in the longitudinal direction. In prior art arrangements, three welding stations are required to effect welding of a single joint (one station for performing pipe interior welding and two stations for performing pipe exterior welding). There may be room for only 4 or 5 welding stations across the deck within the available space in the pipe processing area. In such prior art arrangements, there is therefore insufficient room in one pipe processing area to fit in two sets of three welding stations, as would be required for the forming of a triple length pipe section (having two joints). The two sets of three welding stations therefore need to be provided in separate welding areas, which may therefore reduce the flexibility in the layout of pipe processing stations on deck.

The first welding station may be arranged to form an internal weld at the junction between two single-length pipe sections to form a double-length pipe section. The first pipe processing area may include a welding station arranged to form at least a partial external weld at the junction between two single-length pipe sections of the double-length pipe section. The first pipe processing area may be arranged to complete the welding of the joint between the two single-length pipe sections to form the double-length pipe section (for example by performing the last weld, but not necessarily initiating the welding of that joint). The first pipe processing area may include all of the welding stations needed to effect the welding of the joint between the two single-length pipe sections to form the double-length pipe section.

The first pipe processing area may include a plurality of welding stations to form a partial weld (i.e. not fully completed) at the junction between the double-length pipe section and the further single-length pipe section. The second welding station may be arranged to form an internal weld at the junction between the double-length pipe section and the further single-length pipe section. The first pipe processing area may include a welding station arranged to form at least a partial external weld at the junction between the double-length pipe section and the further single-length pipe section. The second pipe processing area may include a further welding station arranged to form at least a partial external weld at the junction between the double-length pipe section and the further single-length pipe section. The third welding station may be arranged to complete the welding of the joint between the double-length pipe section and the further single-length pipe section.

The second pipe processing area may include one or more post-welding pipe-processing stations. The post-welding pipe-processing stations may include a station arranged to add material, other than weld material, to the welded joint. For example, the station may be arranged to add a pipe coating and/or concrete to the pipe joint. Such a station may be a FJC station (field joint coating and filling). The post-welding pipe-processing stations may include a station arranged to test the joint made by one or more other stations. For example, the station may be arranged to perform non-destructive testing (NDT) of the joint. The first pipe processing area may include no post-welding pipe-processing stations. For example, the stations within the first pipe-processing area may consist only of welding stations. There may be no NDT stations in the first pipe processing area. There may be no FJC stations in the first pipe processing area.

The pipe processing stations in the first and or second pipe processing areas may include one or more pipe beveling stations. A pipe beveling station bevels the end of a pipe section so that the pipe section may be joined to another pipe section. Preferably, the beveling of pipe sections is performed in a location separate from the first and second pipe processing areas. The beveling of pipe sections may be performed at a level (in the vertical direction) in the vessel that is different from the level of at least one of, and preferably both of, the first and the second pipe processing areas.

According to a third aspect of the invention there is provided a pipelaying vessel comprising a deck having at least one pipe processing area comprising a multiplicity of pipe processing stations arranged across the width of the vessel and a pipe storage area for storing pipe sections for subsequent processing in the pipe processing area, the storage area having at least two modes of operation including a first mode of operation in which at least three sets of single-length pipe sections, each pipe section having a length $L_i$, are stored in $X_i$ locations, one positioned after the other in the direction of the length of the pipes, a second mode of operation in which at least two sets of single-length pipe sections, each pipe section having a length $L_j$, are stored in $X_j$ locations, one positioned after the other in the direction of the length of the pipes, and wherein $X_i > X_j > 1$ and $5 \text{ m} < L_i < L_j$.

The vessel may include a storage area, defined by for example a storage bin, in which the pipe sections are so stored. There may be more than 10 pipe sections in each set. It will be appreciated that each set of pipe sections is stored at a single location (with the pipe sections all being positioned at substantially the same distance along the length of the vessel).

According to this third aspect of the invention there is also provided a method of storing pipe sections on a pipelaying vessel, wherein the method comprises the following steps:

providing a vessel comprising a deck having at least one pipe processing area comprising a multiplicity of pipe processing stations arranged across the width of the vessel and a pipe storage area for storing pipe sections for subsequent processing in the pipe processing area, using the storage area in a first mode of operation by storing in the storage area sets of single-length pipe sections, each pipe section having a length $L_i$, in $X_i$ locations, one positioned after the other in the direction of the length of the pipes, using the storage area in a second mode of operation by storing in the storage area sets of single-length pipe sections, each pipe section having a length $L_j$, in $X_j$ locations, one positioned after the other in the direction of the length of the pipes, where $X_i > X_j > 1$ and $5 \text{ m} < L_i < L_j$.

Thus, embodiments of the third aspect of the invention provide a flexible means of storing single length pipe-sections of two different lengths. In prior art arrangements, by way of contrast with the present invention, storage bins are provided, each storage bin being arranged to be used with only one type of pipe section (i.e. pipe sections having the same approximate length), the bins thus having a length slightly longer than 12 m. Thus, there is no easy way in which to convert the storage bins into ones able to store longer pipe sections. $X_i$ may be equal to 3. $X_j$ may be equal to 2.

According to the third aspect of the invention there is yet further provided a pipelaying monohull vessel comprising a deck having at least one pipe processing area comprising a multiplicity of pipe processing stations arranged across the width of the vessel and a pipe storage area for storing pipe sections for subsequent processing in the pipe processing area, the storage area having at least two modes of operation including a first mode of operation in which pipe sections are stored in at least three locations one positioned after the other in the direction of the length of the pipes, each pipe section being of substantially the same length and being at least 10 m long a second mode of operation in which pipe sections are stored in at least two locations positioned in series in the direction of the length of the pipes, and wherein the length of the pipe sections in the second mode of operation is at least 10% longer than the length of the single-length pipe section used in the first mode of operation. There is also provided a method of using such a monohull vessel firstly to store during a first mode of operation pipe sections in at least three locations one positioned after the other in the direction of the length of the pipes and subsequently to remove those pipe sections from the store, and secondly to store during a second mode of operation pipe sections in at least two locations one positioned after the other in the direction of the length of the pipes.

According to the third aspect of the invention there is also provided a pipelaying monohull vessel comprising a deck having at least one pipe prefabrication area comprising a multiplicity of pipe processing stations and a pipe storage bin for storing single-length pipe sections for subsequent processing in the pipe prefabrication area, the storage bin having a length greater than or equal to 36 m, and being arranged for pipe sections to be stored with their axes aligned with the length of the storage bin.

According to a fourth aspect of the invention there is provided a pipelaying vessel comprising a deck having at least two pipe processing areas each comprising a multiplicity of pipe processing stations arranged across the width of the vessel and a pipe storage area for storing pipe sections for subsequent processing in the pipe processing area, the storage area extending across the width of the vessel and having at least one access area at the port side of the deck and at least one access area at the starboard side of the deck, the vessel being arranged such that pipe sections may be fed from the pipe storage area via either access area to either pipe processing area.

According to this fourth aspect of the invention there is also provided a method of prefabricating pipe sections on a pipelaying vessel, wherein the method comprises the following steps:

a) providing a vessel comprising
   a deck having at least two pipe processing areas, each area comprising a multiplicity of pipe processing stations arranged across the width of the vessel, one pipe processing area being located at a first side of the vessel and the other pipe processing area being located at a second side of the vessel,
   a pipe storage area for storing pipe sections for subsequent processing in the pipe processing area, the storage area extending across the width of the vessel and having
   at least one access area at the first side of the vessel and
   at least one access area at the second side of the vessel,
   the first side being one of the port side and starboard side and the second side being the other of the port side and starboard side, b) moving a single-length pipe section from a region of the storage area on the first side of the vessel via the access area on the first side of the vessel to the pipe processing area at the first side of the vessel, c) passing the single-length pipe section from the first side of the vessel to the pipe processing area at the second side of the vessel, and d) then using at least one of the pipe processing stations in the pipe processing area at the second side of the vessel to form a jointed pipe section from the single-length pipe section.

Thus, the pipe storage area may serve either side of the vessel with pipe sections. Such flexibility may be advantageous if, for whatever reason, only one side of the vessel's pipe processing capabilities are fully operational, which for example it might not be if delivery of pipe sections from the storage area on that side of the vessel is blocked or otherwise hindered. The vessel may include a starboard-side crane. The starboard crane may be able to pass single length pipe sections from the first to the second side of the vessel. The vessel may include a port side crane. The port crane may be able to pass single length pipe sections from the first to the second side of the vessel. For example, the port crane may be able to pass single length pipe sections either from the port side of the vessel to the starboard side of the vessel or from the starboard side of the vessel to the port side of the vessel. There may be a step of moving the single length pipe section from an access area towards the centre of the vessel. Such a step may be performed by a crane or may alternatively be performed by other conveying means, such as motorised rollers, chain conveyors, or the like. There may be a step of using a longitudinal conveyor to move the pipe section along the length of the vessel. Such a step may be performed as part of the process of passing the single length pipe section from the first side of the vessel to the second side of the vessel.

The following description, in particular, concerns optional features that may have application in relation to more than one aspect of the invention described herein. It will of course be appreciated in any case that the various aspects of the invention as described herein are closely related and that therefore features of one aspect of the invention may be incorporated into other aspects of the invention as described herein. For example, reference to features of the pipe storage area, the pipe processing area, or the modes of operation of the vessel in relation to one aspect of the invention may apply equally to other aspects of the invention. Also, any aspect of the method of the invention may use, or be performed on, a vessel according to any other aspect of the invention. Similarly, the vessel according to any aspect of the invention may be so configured as to be suitable for use in a method according to any other aspect of the invention. Features of the apparatus of the invention may be incorporated into the method of the invention and vice versa.

The pipe processing area may be in the form of a pipe prefabrication area.

The pipe storage area may be defined by a pipe storage bin. The pipe storage area may be defined by a plurality of pipe storage bins. The pipe storage area may be divided into at least two sub-areas by a vertical bulkhead extending along the length of the vessel. The pipe storage area may be divided into at least two sub-areas by a vertical bulkhead extending across the width of the vessel. There may be four sub-areas of the pipe storage area arranged in two-by-two configuration. Each sub-area may be defined by a bin. The storage areas may be arranged substantially symmetrically about the longitudinal centre line of the vessel.

The number of pipe sections stored at any one time during operation of the vessel during each mode of operation may be greater than 20 pipe sections, and is preferably greater than 100 pipe sections.

The pipe storage area is preferably provided below the main deck of the vessel, preferably in the hold of the vessel. The pipe storage area may be associated with a pipe conveying system. The pipe conveying system may be positioned above the pipe storage area. The pipe conveying system may be arranged to be able to move pipe sections between different locations in the storage area in a direction substantially parallel to the length of the vessel.

Conveying means may be provided to move single-length pipe sections from the pipe storage area to the pipe prefabrication area. An additional storage area may be provided for storing jointed pipe sections prefabricated onboard the vessel. Such an additional storage area may also be in the form of a storage bin having a length greater than or equal to 36 m. The storage bins may be open or partially open on more than one side. For example, the sides of the bin may include openings for transfer of pipe sections into or out of the bin. There may be less than four vertical sides to the bin. The sides of the bin may be defined by an open framework.

Conveying means may be provided to move pipe-sections from one pipe processing station to another. The conveying means may include conveyors arranged to move pipe sections longitudinally along the length of the vessel. The conveying means may include conveyors arranged to move pipe sections transversely across the width length of the vessel. The conveying means may include elevators (such as lifting equipment or lifts) arranged to move pipe sections between decks of the vessel. The conveying means may comprise motorised rollers. The conveying means may comprise chain conveyors. The conveying means may comprise at least one crane.

The vessel is preferably a monohull vessel. The vessel is preferably elongate in shape when viewed from above. The decks of the vessel may therefore be relatively narrow for the length of the vessel. The vessel preferably includes at least three decks for use in connection with pipe sections. There may for example be a prefabrication deck. There may for example be a production deck, on which there is arranged the "firing line". There may for example be a storage deck on which pipe sections are stored.

The prefabrication deck may include at least one pipe processing area comprising a multiplicity of pipe processing stations arranged across the width of the vessel. There may be a first pipe processing area and a further pipe processing area, each pipe processing area comprising a multiplicity of pipe processing stations arranged across the width of the vessel. The first and further pipe processing areas may be position at the same location along the length of the vessel. The pipe processing stations of the first and further pipe processing areas may be positioned at substantially the same distance along the length of the vessel. The pipe processing stations of the first and further pipe processing areas may be positioned across substantially the entire width of the deck. There may of course be first and second pipe processing areas, each comprising a multiplicity of pipe processing stations arranged across the width of the vessel, the second pipe processing area being arranged at a different position along the length of the vessel. There may be four pipe processing areas. The four pipe processing areas may be arranged so that there are two pairs of pipe processing areas, each pair being arranged to prefabricate jointed pipe sections independently of the other pair. The four pipe processing areas may be arranged so that there are two pairs of pipe processing areas, each pair being arranged on one side of the longitudinal centre line of the vessel.

The number of pipe processing stations arranged across the deck from the longitudinal centre line to the edge of the vessel, in a pipe processing area, is preferably greater than three. The number of pipe processing stations arranged across the deck from the longitudinal centre line to the edge of the vessel, in a pipe processing area, may be less than six. The total number of pipe processing stations arranged on the vessel for simultaneous use during prefabrication of jointed pipe sections may be greater than 10, and is preferably greater than 16, and may even be more than 20. The vessel may have a width of about 30 m or more. The vessel may have a width of about 50 m or less. For example, the vessel may have a width of 35 m to 45 m. The vessel may have a length of greater than 250 m.

The pipe sections may have a relatively large diameter. The diameter of the pipe sections may be greater than 0.6 m, may be greater than 1 m and may even be greater than 1.4 m.

The vessel may be configured to be suitable for laying pipeline in deep water, for example, to depths of over 1000 m. The vessel may be configured to lay pipeline in the S-lay configuration.

The vessel may be configured to be suitable for laying pipelines in shallow water, for example, to depths of less than 500 m, such pipelines for example having a diameter greater than 0.4 m and more preferably greater than 0.6 m. The vessel may be configured to be suitable for laying pipelines of any diameter in deep water (for example, depths of over 1,000 m) and in ultra deep water (for example, depths of over 2,000 m).

The vessel may include a dynamic positioning system.

A single vessel, or method of processing/handling/storing pipe sections, may embody several different concepts relevant to the present invention. Any or all of the features associated with these concepts may be optional and may be associated with any of the first to fourth aspects of the invention. Some such features will now be summarised. (Of course, other features associated with the first to fourth aspects of the present invention are described herein.)

The vessel may have a deck on which there are arranged a multiplicity of pipe processing stations across the width of the vessel. The pipe processing stations may define at least one pipe processing area, and possibly first and second pipe processing areas. The vessel may have at least two modes of operation. In a first mode of operation, the pipe processing stations may form jointed pipe sections extending longitudinally along the length of the vessel, each jointed pipe section being formed by joining together at least three single-length pipe sections each having a fixed length. In the second mode of operation, the pipe processing stations may form jointed pipe sections by joining together a plurality of single-length pipe sections each having a fixed length, and using fewer but longer single-length pipe sections per jointed pipe section than in the first mode. At least a plurality of the pipe processing stations may perform a function in both the first and second modes of operation. During prefabrication of jointed pipe sections, it may be necessary to arrange two single-length pipe sections end-to-end to define a junction therebetween. A first pipe processing station in a first pipe processing area may then form a partial weld at the junction between the two single-length pipe sections. The two single-length pipe sections, when so connected, may be considered as defining a double-length pipe section. Such a double-length pipe section may be passed to a second pipe processing station, which may also be in the first pipe processing area. The second pipe processing station may then form a partial weld at a junction between the double-length pipe section and a further single-length pipe section arranged end-to-end in relation thereto, thereby forming a triple-length pipe-section. The triple-length pipe section so formed may then be passed to a third pipe processing station, for example in a second pipe processing area. The third pipe processing station may then add weld material to the region of the junction between the double-length pipe section and the further single-length pipe section. The vessel may comprise a pipe storage area for storing pipe sections for subsequent processing in the pipe processing area. The storage area may be used in two modes of operation. In a first mode at least three single-length pipe sections, each having a fixed length, may be stored in the storage area in locations, one positioned after the other in the direction of the length of the pipes. In the second mode, fewer, but longer pipes may be stored in the storage area by storing single-length pipe sections in locations, one positioned after the other in the direction of the length of the pipes. The single-length pipe sections may each be longer than 5 m. The storage area may extend across the width of the vessel, for example, across substantially the entire width. The storage area may have at least one access area at the port side of the deck. The storage area may have at least one access area at the starboard side of the deck. A single-length pipe section may be moved from one of the port side of the vessel and the starboard side of the vessel to the other side. A single-length pipe section previously stored on one side of the vessel may thus be passed via the access area on that side of the vessel to the pipe processing area on the opposite side. The single-length pipe section may then be used, together with another pipe section, by one of the pipe processing stations in the pipe processing area to form a jointed pipe section.

The vessel and/or the method according to any aspect of the present invention may be configured as disclosed in UK patent application number GB 0704411.8 entitled "Undersea Pipe Laying", with agent's reference 12640GB/JEB, filed on 7 Mar. 2007. The contents of that application are fully incorporated herein by reference. The vessel and/or method of the present invention may incorporate any of the features disclosed in that UK patent application. In particular, the claims of the present application may be amended to include any of the features disclosed in that application. For example, the vessel of the present invention may include an elevated pipe-laying path and/or a protected stern area as described and claimed in that patent application.

BRIEF DESCRIPTION OF THE DRAWINGS

An embodiment of the present invention will now be described, by way of example only, with reference to the accompanying drawings, of which:

FIG. 3a is a view of a pre-fabrication deck of the vessel as seen from above when the vessel is used to make triple joints;

FIG. 3b is a view from above of the pre-fabrication deck of the vessel when used to make double joints;

FIGS. 4a and 4b are partial, but enlarged, views of the vessel as shown in FIG. 3a;

FIG. 4c is a schematic diagram illustrating the sequence of steps used in triple joint prefabrication effected by the vessel of FIG. 3a;

FIGS. 4d and 4e are partial, but enlarged, views of the vessel as shown in FIG. 3b.

DETAILED DESCRIPTION OF EMBODIMENTS

Figure 1:
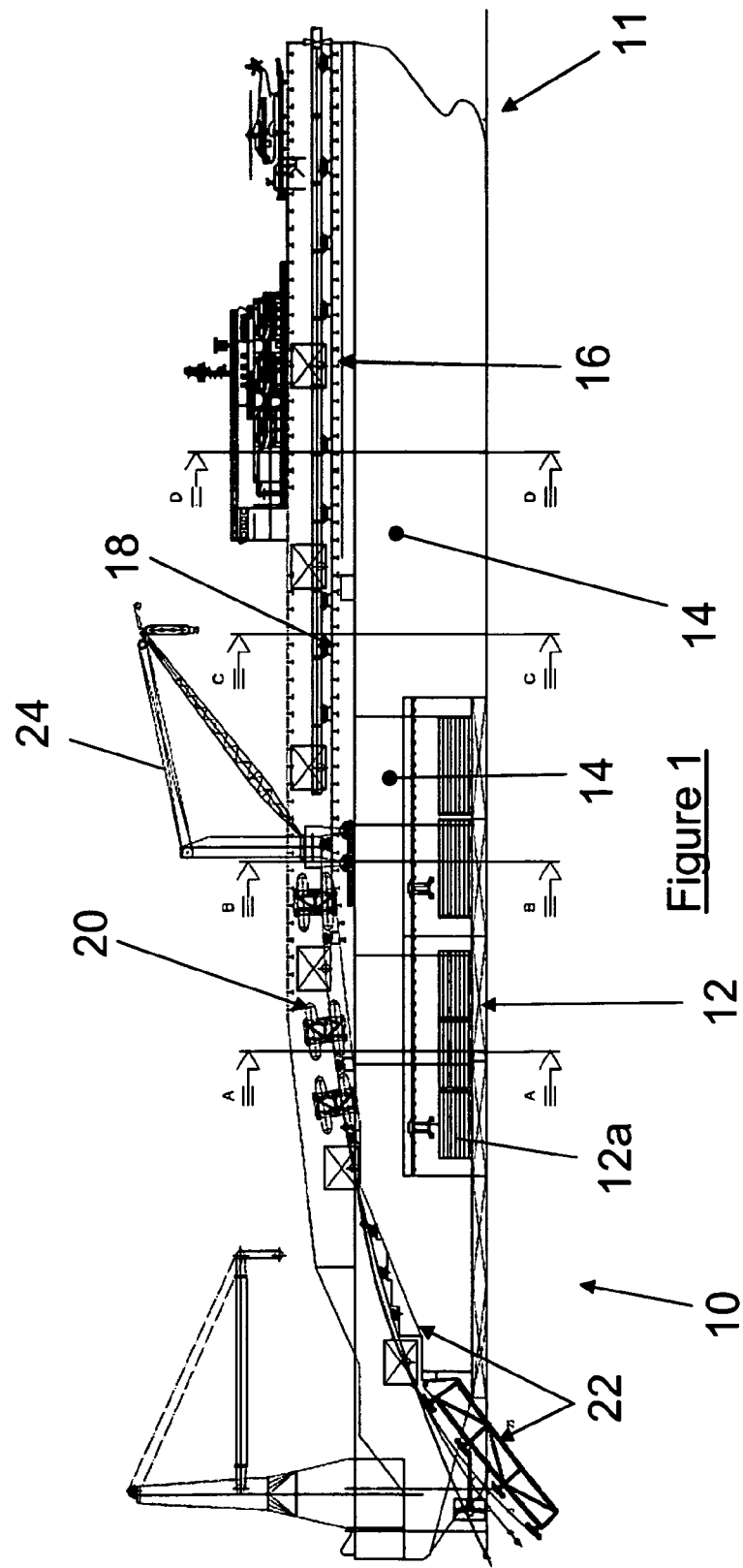
FIG. 1 is a side view, partly in section, of a vessel according to an embodiment of the invention.

FIG. 1 shows a narrow mono-hull pipelaying vessel 10 having a width of about 40 m on the main deck and a length of about 330 m. The vessel 10 is arranged to fabricate, assemble and lay pipeline from single length pipe sections ("bars"). Such single length pipe sections are stored in a storage area 12 in the vessel's hold. Single length pipe sections are transported, when required, from the storage area 12 to a pre-fabrication deck 14, where such single length pipe sections are welded together to form either double joint pipe sections or triple joint pipe sections. (The pre-fabrication deck 14 is hidden from view in FIG. 1). The pipe storage and prefabrication facilities on board the vessel are symmetrically repeated across the vessel, so that the port-side facilities may be considered as a symmetrical reproduction of the starboard-side facilities. The pre-fabrication deck 14 produces jointed pipe sections having a length of 36 meters. The 36 meter jointed pipe sections are temporarily stored in a firing line feed area 16 (hidden from view in FIG. 1), for subsequently feeding the production deck 18 which includes a firing line 20. In the firing line 20, the 36-meter jointed pipe sections are welded to the end of a pipeline that is eventually fed out from the vessel 10 via a ramp and stinger assembly 22. The pipe sections used and laid by the vessel may have a relatively large diameter, for example of up to 60" (1.52 m).

Figure 2A:
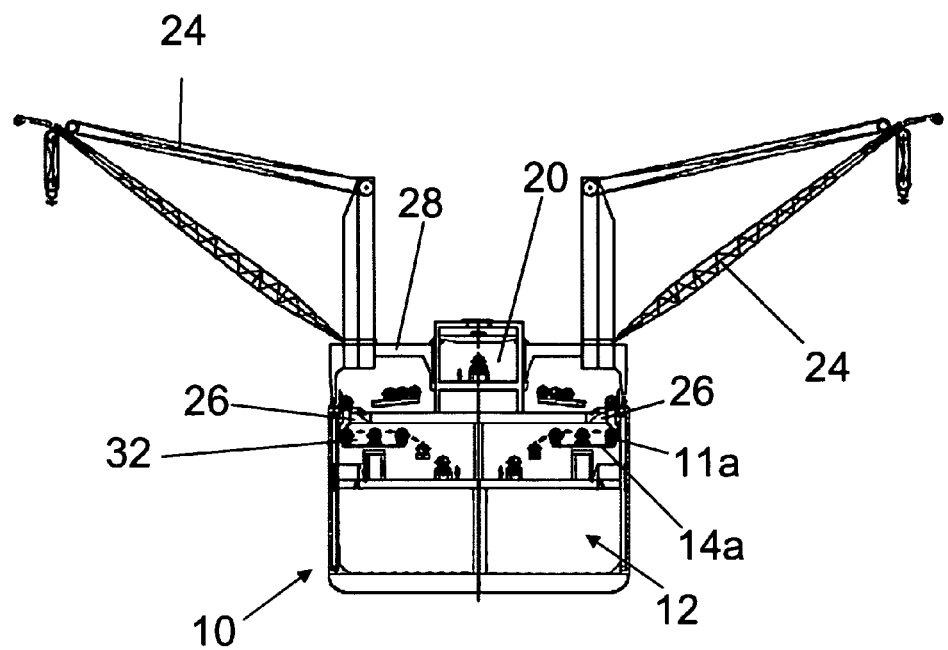
FIG. 2a is a cross-section of the vessel taken along the line A-A as shown in FIG. 1.
Figure 2B:
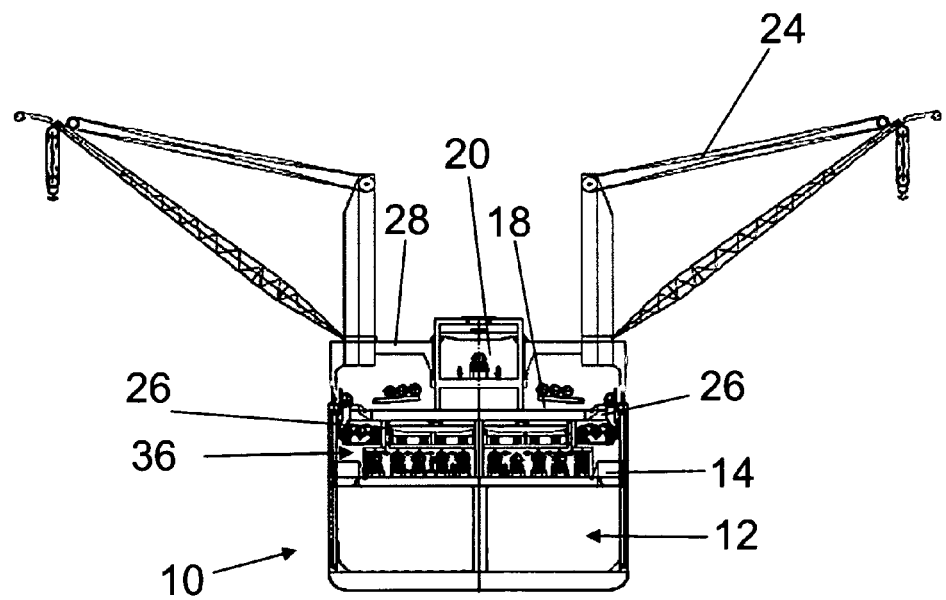
FIG. 2b is a cross-section of the vessel taken along the line B-B as shown in FIG. 1.

FIGS. 2a to 2d are schematic drawings each showing a view of the vessel 10 in cross-section, the cross-sections being taken at positions in the region of the lines A-A, B-B, C-C and D-D, respectively. The sequence of operation will now be described in further detail with reference to FIGS. 2a to 2d. Single length pipe sections (typically called bars) are supplied to the vessel 10 via special shuttles (such as pipe carriers or barges), which deliver the single length pipe sections to the broad sides of the vessel, either the starboard-side of the port-side. The pipe sections are lifted from such shuttles by means of one of the two cranes 24 provided for that purpose. Single length pipe sections are set down on the main deck 18, which is of a generally open construction (open to atmosphere). (Whilst FIGS. 2a and 2b might suggest that the main deck is covered, it will be appreciated that FIGS. 2a and 2b are views taken in cross-section and the structure labelled as 28 in FIGS. 2a and 2b is in the form of a cross beam that provides support for the cranes 24.)

The single length pipe sections are then delivered to the storage area 12 in the vessel's hold via one of four access areas, typified in this embodiment by delivery slots 26 provided in the main (upper) deck. Each slot has a length of about 19 m and a width of about 1.8 m. The pipe sections are lowered from the slot by means of an elevator system, there being four elevator systems, one being associated with each respective slot. Each of the two cranes 24 is able to transport single length pipe systems to any of the four slots 26. Each of the four elevators is able to carry at least two single length pipe sections at a time and is arranged to travel from the top deck 18 to the storage area, representing a travel in height of about 30 meters.

Single length pipe sections are delivered from the storage area 12 by the elevators, when required, to beveling stations on an intermediate prefabrication deck 14a, which is positioned above the primary prefabrication deck 14 and below the main deck 18 (see FIGS. 2a and 2c). There are four beveling areas on the vessel, all on the same intermediate level, there being a bow beveling area and a stern beveling area provided both on the port-side and starboard-side of the vessel. There are also four pipe prefabrication areas, where welding and further processing of pipe joints is effected, there being stern and bow prefabricating areas on the same primary prefabricating deck 14, two being provided on the port side and two being provided on the starboard side of the vessel 10 (see FIGS. 2b and 2d). Once prefabrication of the jointed pipe sections is completed, the completed pipe joints are then stored in the jointed pipe section storage area 16, which is located on the main deck 18 and forward of the intermediate prefabrication deck 14a (to the bow end).

Jointed pipe sections are then fed (typically from the storage area 16) to the elevated firing line 20 on the main deck 18 by means of further elevators.

The vessel 10 may be used to lay pipeline using either prefabricated double length pipe sections or prefabricated triple length pipe sections. The vessel thus has two modes of operation: a first mode using triple joints (i.e. triple length pipe sections, hereinafter referred to by the abbreviation 3J) and a second mode of operation using double joints (i.e. double length pipe sections, hereinafter referred to the abbreviation 2J). 3J pipe sections consist of three standard bars (single length pipe sections), each having a length of 12 meters, thereby creating a 3J pipe section having a total length of 36 meters. 2J pipe sections consist of two bars, each having a length of 18 meters, thereby also producing jointed pipe sections having a length of about 36 meters. The standard length of single length pipe section used in the field of offshore pipelaying has typically been 12 meters. On-shore pipelaying operations are increasingly using single pipe length sections having a length of 18 meters and as such, such pipe sections are now readily available from certain pipe suppliers.

There now follows a description of the use of the vessel 10 in the first mode operation, using 3J pipe sections, with reference to FIGS. 2a to 2d, 3a, 4a and 4b of the drawings.

The following description refers to one side of the vessel 10. It will be appreciated that because the configuration of the pipe prefabrication equipment is generally symmetrical, the operations conducted on the other side are substantially the same. With reference to FIGS. 2a and 3a, a single length pipe section (hereinafter referred to as a "bar") is taken from the rearward hold 12a (although the bar could equally be taken from the front hold), placed on the elevator in the hold, and then elevated to a first intermediate prefabricating deck 14a, where beveling is conducted. Each bar is about 12 m long. The level of the first intermediate prefabricating deck 14a is also called a "beveling plane". The beveling plane is positioned about 3 m above the prefabricating deck 14. On said beveling plane, there is a bi-directional conveying line having a length of about 80 m and which extends from just in front of the bow delivery slot 26a to behind the stern delivery slot 26b (see FIG. 3a), thereby allowing the elevator associated with any slot to deliver bars to the conveying line on the beveling plane. FIG. 2a shows a section of the vessel which includes the stern slots, and also shows a pipe section 11a being conveyed along the conveying line (the outermost pipe section shown in FIG. 2a). At each end of the conveying line there is located a beveling station, on the beveling plane. Thus, as shown in FIG. 3a, the vessel includes a stern beveling area 32 and a bow beveling area 34. The stern beveling area 32 is used (see FIGS. 2a and 3a) to bevel the ends of a single bar. The bow beveling area 34 is used (see FIGS. 2c and 3a) to bevel, in parallel, the ends of two bars with two beveling stations. (Thus, in the 3J mode the bow beveling area 34 has twice as many beveling stations and personnel as compared with the stern beveling area.) The beveled bars are moved in the transverse direction (across the width of the vessel) by means of transverse conveyors. It will be appreciated that in addition to such transverse conveyors for conveying pipe sections from one pipe processing station to the next in the transverse direction, there are also conveying corridors on the vessel for conveying pipes in the longitudinal direction (i.e. along the length of the vessel). These longitudinal conveyors include not only the conveying lines, mentioned above, positioned at the sides of the vessel for conveying between the slots 26, but also a central conveying line down the middle of the vessel.

Two types of beveling are effected by the beveling stations, namely: "A" type—fit for welding GMAW—and "B" type—fit for submerged arc welding. In the case of a 3J pipe section, three beveled bars are provided having beveled endings in the form of an AB bar (i.e. a bar having a first A-bevel end and a second B-bevel end), a BB bar (i.e. with both ends being provided with a B-bevel) and a BA bar. Thus, the triple joint is formed by means of submerged arc welding together two pairs of B-beveled bar endings, thereby forming a 3J pipe section having the bevel configuration AB+BB+BA so that the joined bar-ends of the 3J pipe section are of the same typology (B-B) and the extreme faces of the realized 3J pipe are fit for the GMAW welding used in the firing line (forming an A-A joint between two 3-J pipe sections). In this embodiment, the bow beveling area 34 produces BB and BA bars, whereas the stern beveling area 32 produces AB bars.

Figure 2C:
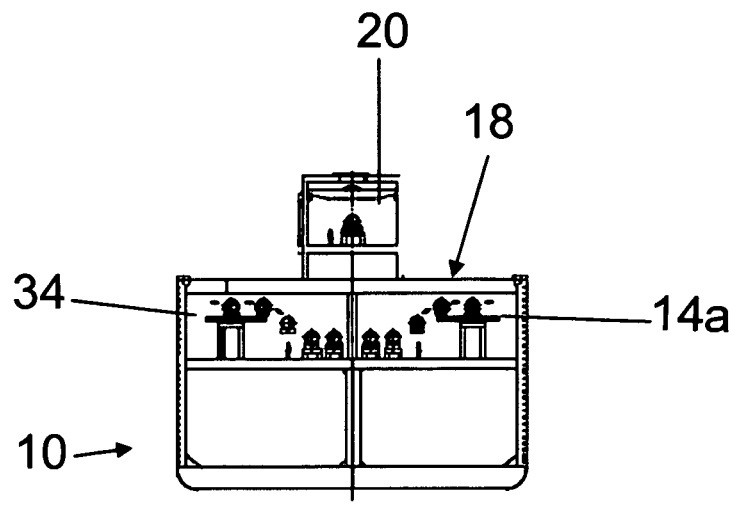
FIG. 2c is a cross-section of the vessel taken along the line C-C as shown in FIG. 1.
Figure 2D:
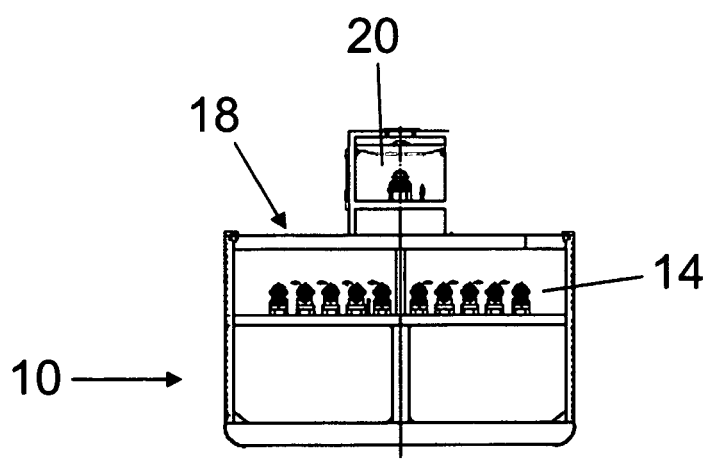
FIG. 2d is a cross-section of the vessel taken along the line D-D as shown in FIG. 1.

From the beveling stations, the bars are lowered from the level of the intermediate prefabricating deck 14a to the level of the main prefabricating deck 14, as can be seen in FIGS. 2a and 2c. On the main prefabricating deck 14 there is placed the 3J prefabricating system, again being configured in two symmetrical and independently operable parts (one on the starboard side and the other on the port side). The starboard 3J prefabricating system may be fed by either the starboard or port beveling stations, by means of the central and side longitudinal conveying corridors. The port 3J prefabricating system may similarly be fed by either the starboard or port beveling stations. Thus, the two parts of the 3J prefabricating system can operate, if desired, with a single conveying line on one side of the vessel.

Figure 4A:
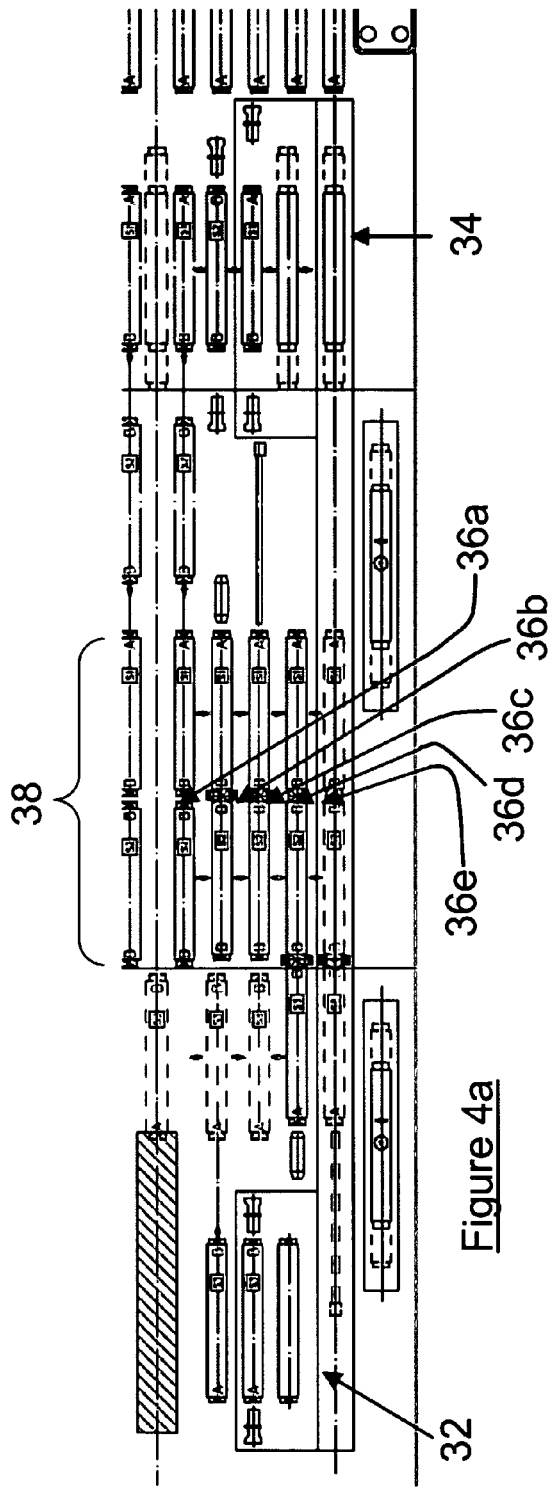
Figure 4B:
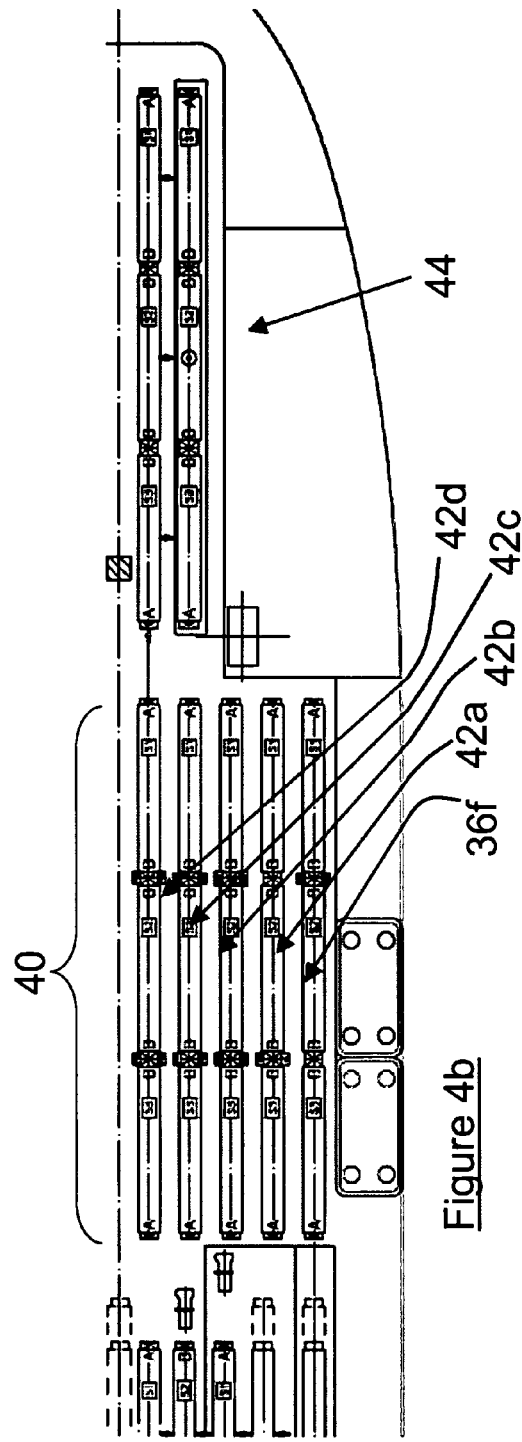

With reference to the starboard 3J prefabricating system as shown in FIGS. 4a and 4b, there are two pipe processing areas 38, 40, a stern pipe processing (welding) area 38 and a bow pipe processing (a welding and post-welding) area 40. The stern pipe processing area 38 includes three 2J welding (submerged arc welding) stations 36a to 36c which assemble in parallel the BB and BA bars produced by the bow beveling station; as result a BB+BA joint is obtained. In these welding stations the single bars, conveyed from the bow beveling station 34, are first lined up so that a preliminary external weld can be laid down (first station 36a); then moved to a second station 36b where the internal weld is effected; and then moved to the third station 36c, where the external weld is completed. The conveying from one welding station 36 to another takes place through translation of the pipe across the deck in the transverse direction with means conventionally used in the art, such as for example chain conveyors.

The 2J bar is then further translated to a fourth welding station 36d (a 3J welding station) in the stern pipe processing area 38. At the same time a further AB single bar is conveyed from the stern beveling station 32 to the fourth welding station 36d positioned (with a lining-up clamp) relative to the 2J bar, and then welded thereto to form a partial external weld at the AB+BB double joint, thereby creating a partially completed 3J pipe section having a AB+BB+BA triple joint configuration. This fourth welding station 36d is followed by a fifth welding station 36e, which is placed just below the conveying line. The fifth welding station 36e effects the internal weld on the AB+BB double joint, the other BB+BA joint having been completed by the third station 36c. The partially completed triple joint is then longitudinally conveyed out of the stern pipe processing area 38 to the bow pipe processing area 40 with the starboard conveyor system 33 (see FIG. 3a).

The bow pipe processing area 40 includes a sixth welding station 36f (a 3J welding station—see FIG. 4b), at which the external weld of the AB+BB double joint is completed, thereby producing a fully-welded 3J joint. Afterwards, the joint is translated to a first pair of post-welding stations arranged at transverse position 42a across the vessel (see FIG. 4b) for non destructive tests (NDT) on the welding, there being one station for each joint to be tested. If the NDT performed indicates that the joint is not acceptable, then the 3J pipe section is rejected, typically being longitudinally extracted toward stern (below the bow beveling station 34) or otherwise removed. The bow pipe processing area 40 additionally includes a further three pairs of post-welding stations (six in total), the pairs being arranged at three respective transverse positions 42b, 42c and 42d, across the vessel. These two subsequent stations (at locations 42b to 42d) are provided to restore the pipe coating in the region of the joints (field joint coating and filling or FJC stations), there being three FJC stations per joint. Certain operations are therefore performed simultaneously on the two joints in the 3J pipe string. In particular, in this embodiment NDT is performed on two welds of the same pipe string simultaneously and FJC operations are similarly performed simultaneously. Thus, the four positions for post-welding processing of the pipe string are used to perform one NDT operation and three FJC (including filling) operations on each of the two joints of the 3J pipe string.

Once the FJC process is completed by the last pair of FJC stations 42d, prefabrication of the 3J pipe section is complete. The 3J pipe section (typically called a "pipe-string") has a length of about 36 m. The 3J pipe section is then conveyed toward bow to a bow dynamic storage area 44, which is used as the supply of 3J pipe sections for feeding of the firing line 20, where the pipe sections are welded to the end of the pipeline being laid by the vessel 10. This dynamic storage area 44 is fed in parallel by both the 3J prefabricating systems (both port and starboard) of the vessel. The area 44 is also used as an area in which to perform welding repairing operations, if necessary. 3J pipe sections are fed from the storage area 44 to the main deck 18 via dedicated elevators (not shown in FIG. 4b) through dedicated slots (also not shown in FIG. 4b).

Figure 4C:
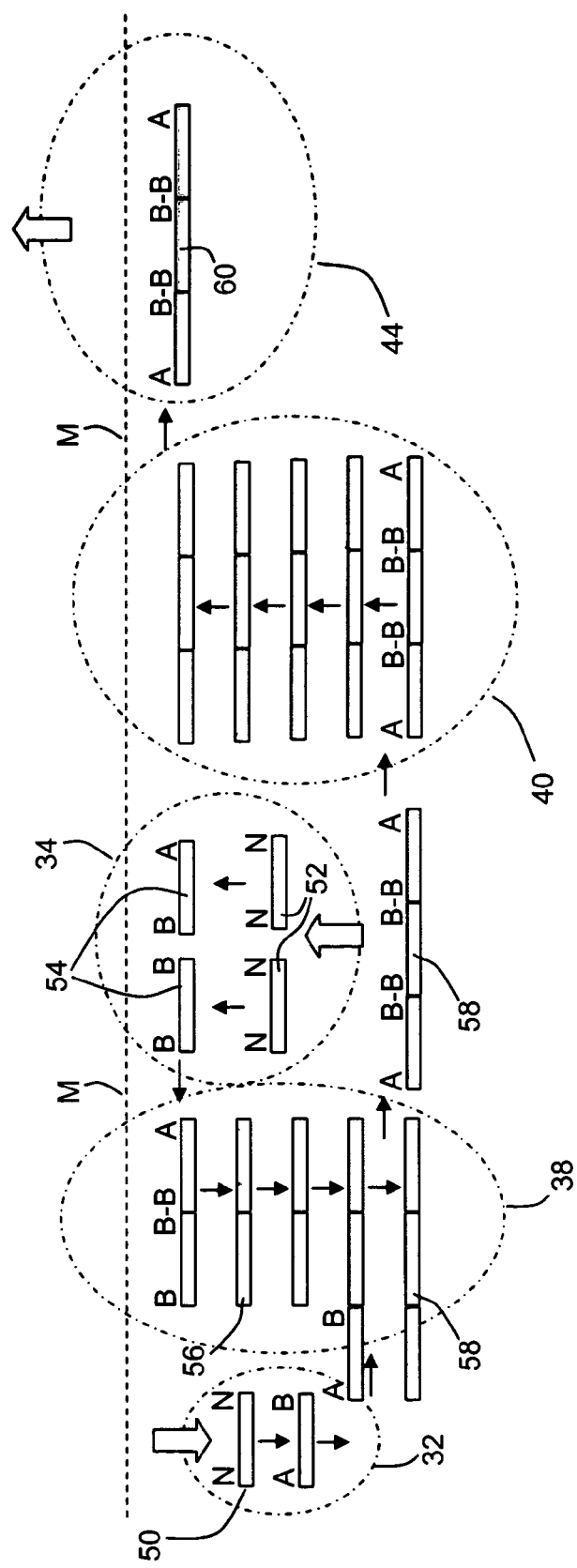

The process described above is summarised schematically by FIG. 4c, which shows the beveling of non-beveled pipe sections 50, 52 in beveling areas 32, 34 to produced beveled bars of the A-B, B-B, and B-A configuration. First, two beveled bars 54 (beveled with B-B and B-A bevels) are conveyed from the bow beveling area 34 to the first pipe processing area 38, at a region near to the midline, M, of the vessel. The two beveled bars are welded together as they progress towards the starboard edge of the vessel (downwards in FIG. 4c) to form a 2J pipe joint 56 (having a BB+BA configuration). At the starboard edge, the first pipe processing area 38 is fed with a beveled A-B bar from the stern side (by the stern beveling area 32), which is then part-welded to the 2-J pipe section 56 to form a partially welded 3-J pipe section 58. The partially welded 3-J pipe section 58 is then conveyed, towards the bow, to the second pipe processing area 40 at a region at starboard edge of the vessel. As the pipe section is conveyed back towards the midline M of the vessel, the weld joint between the 2-J pipe section and the A-B beveled bar is completed and various NDT and FJC operations are conducted, thereby producing a finished 3-J pipe section 60, which is conveyed towards the bow, where the pipe section may be stored in the storage area 44.

As mentioned above, the vessel may also be used to produce double joint pipe sections having a length of 36 m, by welding together two long single-length pipe sections (bars) each having a length of about 18 m. The principal differences between the two modes of operation will now be described with reference to FIGS. 4d and 4e. Single length bars having a length of 18 m are loaded onto one of the outer conveying lines (for example the starboard conveying line). From here the bars are taken only to the bow beveling area 34, where, in parallel, two bars are prepared in conformity with the AB and BA bevel configuration. The stern beveling area need not be operational. The beveled bars are then conveyed towards stern to the first pipe section processing area 38, for welding together at three consecutive welding stations, 36b, 36c, 36d (corresponding to the second to fourth welding stations mentioned above in the triple joint prefabrication method). The first and fifth welding stations 36a and 36e (shown in FIG. 4a) need not be used/provided in this mode of operation. The first station 36a' in this mode of operation is used merely as a "transit station". The first welding station 36b lines-up the bars with a line-up clamp and applies a partial external weld. The second welding station 36c performs an internal weld. The third welding station 36d completes the external weld. The fully welded pipe section is then conveyed to the bow to a transit station (the sixth welding station in the 3J mode and not shown in FIG. 4e) in the second pipe processing area 40

(see FIG. 4e). The 2J pipe section is then conveyed towards the mid-line of the vessel via an NDT testing station 42a' (equivalent to one of the pair of NDT stations used in the 3J mode) and three FJC station 42b' to 42d' (equivalent to one of three of the six FJC stations in the 3J mode, only one of each pair of stations being needed in the 2J mode). It will be appreciated that, in the 2J mode of operation, the number of the active working stations may be lower. However, in both modes (i.e. in both 2J and 3J pipe section prefabrication) some of the same equipment and some of the same stations are used, thereby enabling the vessel 10 to be easily set up to operate in either the first (3J) mode or in the second (2J) mode.

Figure 5:
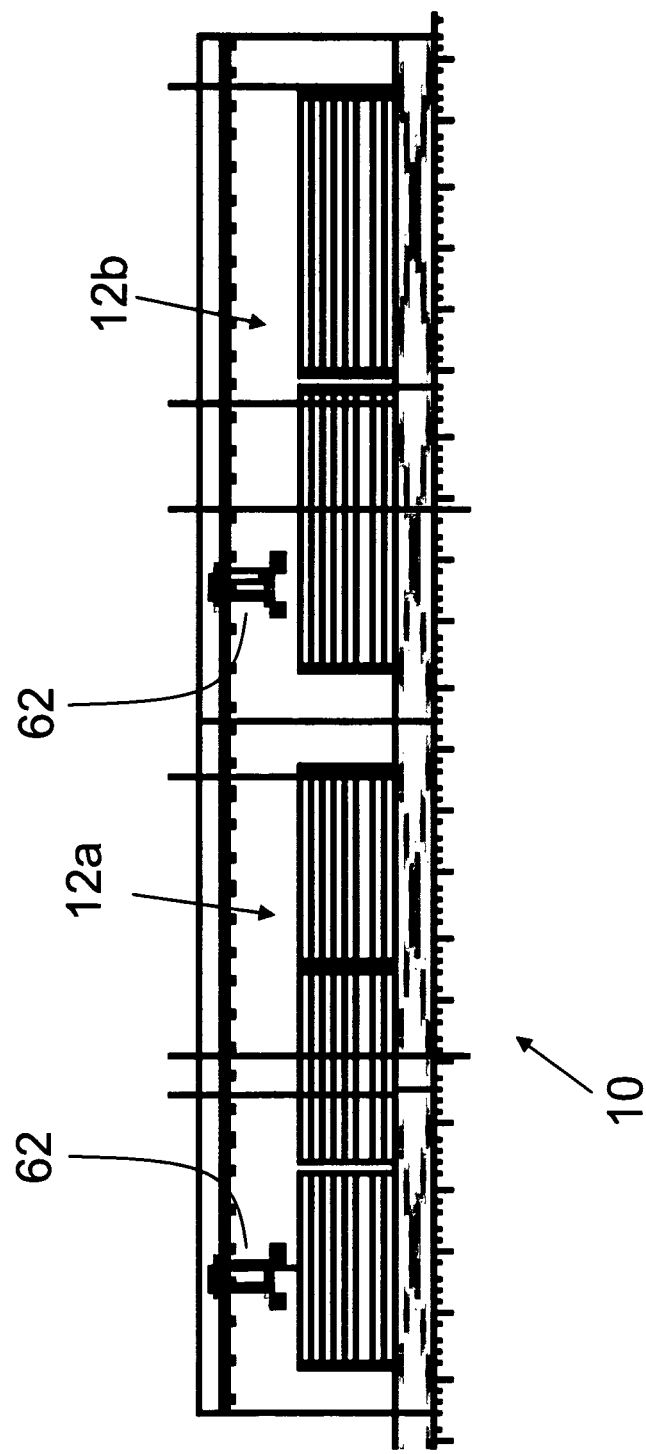
FIG. 5 is a partial, but enlarged, view of the vessel as shown in FIG. 1.

As described above, the vessel 10 may readily be configured to operate in either a 2J mode (prefabricating 36 m pipe sections from two 18 m bars) or a 3J mode (prefabricating 36 m pipe sections from three 12 m bars). In either case, the bars are typically delivered to the vessel in bulk by smaller vessels and loaded onto the vessel 10 by means of the cranes 24 and subsequently stored in the storage plane (the lowermost deck level on the vessel 10). The storage area(s) provided for storing the bars are flexible in that either 12 m or 18 m bars may be stored in the storage area. FIG. 5 show the vessel's storage area 12. Unlike conventional vessels, where such storage areas are typically highly compartmentalised being about 13 m in length, thereby restricting the size of pipes able to be efficiently stored therein, the storage area 12 of the present vessel is bigger and has more open space. The storage area 12 is divided into four separate storage bays, each bay having a length of about 38 m, a width of about 22 m and a height of about 16 m, there being two bow bays 12b (one port-side and one starboard-side) and two stern bays 12a (one port-side and one starboard-side). A longitudinal bulkhead (not shown in the Figures) divides the port and starboard bays. The storage bays may be separated from each other lengthwise to allow lifting equipment and personnel to move freely in between stored pipe stacks. As a result of each storage bay having a length of over 36 m, it is possible to store lengthwise and in series three stacks of 12 m long bars (as shown in the stern bay 12a in FIG. 5) or two stacks of 18 m long bars (as shown in the bow bay 12b in FIG. 5). Whilst FIGS. 1 and 5 show the vessel 10 storing both 12 m bars and 18 m bars simultaneously, it will be appreciated that the vessel 10 will typically be operated in either the 2J mode or the 3J mode at any given time.

As mentioned above, there are four transfer access areas providing access to the storage bays, each access area being in the form of a slot 26 associated with a respective storage bay. Pipe sections may be transferred by longitudinal conveyors at the longitudinal edges of the main deck between the bow and stern slots, whether on the port or on starboard side. Pipes may be also transferred by other conveying means (for example by means of one of the cranes 24 on board the vessel, or by means of chain conveyors on the deck) in a transverse direction across the deck. Pipe sections may therefore be transferred from a longitudinal edge of the deck to the midline of the deck. From there, a pipe section may be transferred towards bow or stern by means of the central conveying line, and/or may be moved transversely again. Thus, pipes can be delivered from any storage bay, via its respective access slot, to be processed either on the same side of the vessel as the storage bay or if necessary on the opposite side. Such flexibility may be used to increase productivity, for example by allowing simultaneous loading of the vessel and continued pipe prefabrication. For example, pipe sections may be delivered to both port slots, thereby hindering transfer, in the conventional manner (i.e. from the port pipe storage bay), of pipe sections to the pipe processing station on the port side. With the method of this embodiment of the invention, the pipe processing stations on the port and starboard sides may both still be operational, because both sides may be fed with pipe sections from the starboard slots and starboard storage bays.

Whilst the present invention has been described and illustrated with reference to particular embodiments, it will be appreciated by those of ordinary skill in the art that the invention lends itself to many different variations not specifically illustrated herein. By way of example, the bow beveling area may, in the 3J mode of operation, effect beveling of only the bar having the BA bevel configuration, the stern beveling station providing two beveled bars having the AB and BB configuration. The beveling of the bars may of course be effected in further ways utilising one or both of the bow and stern beveling areas.

The beveling stations may be arranged to operate on a ramp or a structure with large steps sloping down from the beveling plane to the prefabrication deck. As a further alternative, the beveling stations may lie directly on the prefabricating deck, there being no intermediate prefabrication deck.

Rather than completing the FJC operations on the prefabricating deck (i.e. on the same deck as the prefabricating welding operations), the FJC operations may instead take place on the main deck, and/or on the same level as the firing line.

When the prefabricated pipe sections (in either the 2J mode or the 3J mode of operation) are completed, they may be stored, for example dynamically stored for future use in the firing line. The area in which the finished prefabricated pipe sections may be stored may be in a position such as the prefabrication deck, or in a position parallel with the main deck.

The cranes 24 may be dispensed with and alternative conveying means, for example chain conveyors, motorised rollers and/or elevators, used to transfer pipe sections from one location on the vessel to another.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of laying pipeline from a vessel, wherein the method comprises the following steps:
   a) providing a vessel having a deck on which there are arranged a multiplicity of pipe processing stations across the width of the vessel, the pipe processing stations defining at least one pipe processing area,
   b) simultaneously operating the pipe processing stations in a first mode of operation to form a multiplicity of jointed pipe sections extending longitudinally along the length of the vessel, each jointed pipe section being formed by joining together a number, $X_i$, of single-length pipe sections each having a length $L_i$, and
   c) operating the pipe processing stations in a second mode of operation by forming a multiplicity of jointed pipe sections, each jointed pipe section being formed by joining together a number, $X_j$, of single-length pipe sections each having a length $L_j$,
   wherein $X_i > X_j > 1$, $L_i < L_j$, and at least a plurality of the pipe processing stations perform a function in both the first and second modes of operation.

2. A method according to claim 1, wherein the first and second modes of operation are performed at different times.

3. A method according to claim 1, wherein $X_i=3$ and $X_j=2$.

4. A method according to claim 1, wherein 5 meters $<L_i<L_j$ pipe laying.

5. A method according to claim 4, wherein $L_i>10$ meters and $L_j>15$ meters.

6. A method according to claim 1, wherein the product $X_iL_i$ is substantially equal to the product $X_jL_j$.

7. A method according to claim 1, wherein at least a plurality of the pipe processing stations perform the same function in the same location in both the first and second modes of operation.

8. A method according to claim 1, wherein both the first mode of operation and second mode of operation include the step of joining the pipe sections together with the pipe section disposed in an approximately horizontal orientation.

9. A pipelaying vessel comprising a deck having at least one pipe processing area comprising a multiplicity of pipe processing stations arranged across the width of the vessel and arranged to process pipe sections in parallel with the pipe sections extending longitudinally along the length of the vessel, wherein said multiplicity of pipe processing stations have at least two modes of operation including a first mode of operation in which at least a plurality of the pipe processing stations are used to form jointed pipe sections, each jointed pipe section being formed from a number, $X_i$, of single-length pipe sections each having a length $L_i$, and a second mode of operation in which the pipe processing stations, including at least a plurality of the pipe processing stations used in the first mode of operation, are used to form jointed pipe sections, each jointed pipe section being formed from a number, $X_j$, of single-length pipe sections each having a length $L_j$, and wherein $$X_i>X_j>1 \text{ and } L_i<L_j.$$

10. A pipe laying vessel according to claim 9, wherein $X_i=3$ and $X_j=2$.

11. A pipelaying vessel according to claim 9, wherein at least some of the plurality of pipe processing stations are arranged to perform welding operations to form joined pipe sections, the welding operations performed while the pipe sections are disposed in a horizontal orientation.

* * * * *